Figure 1:
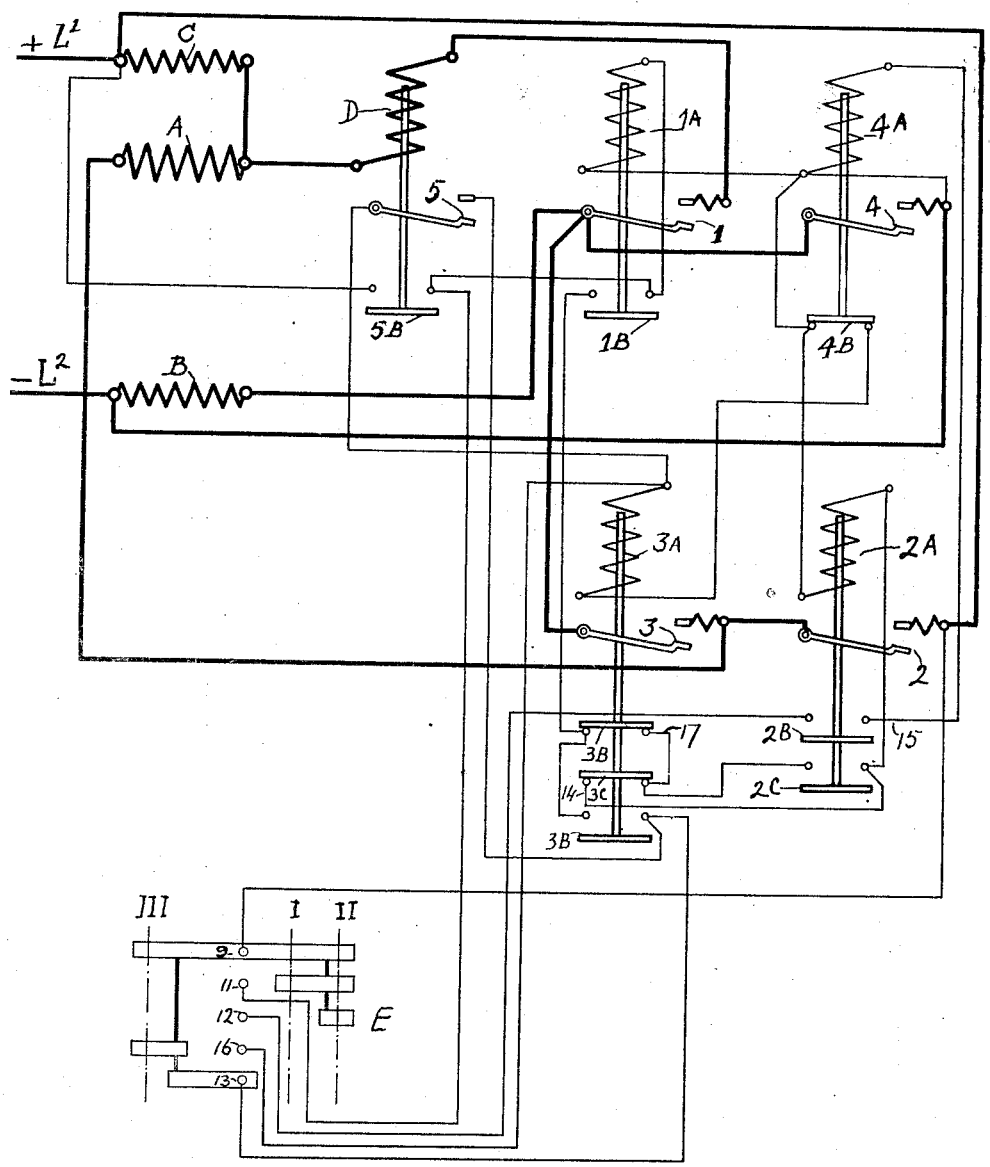

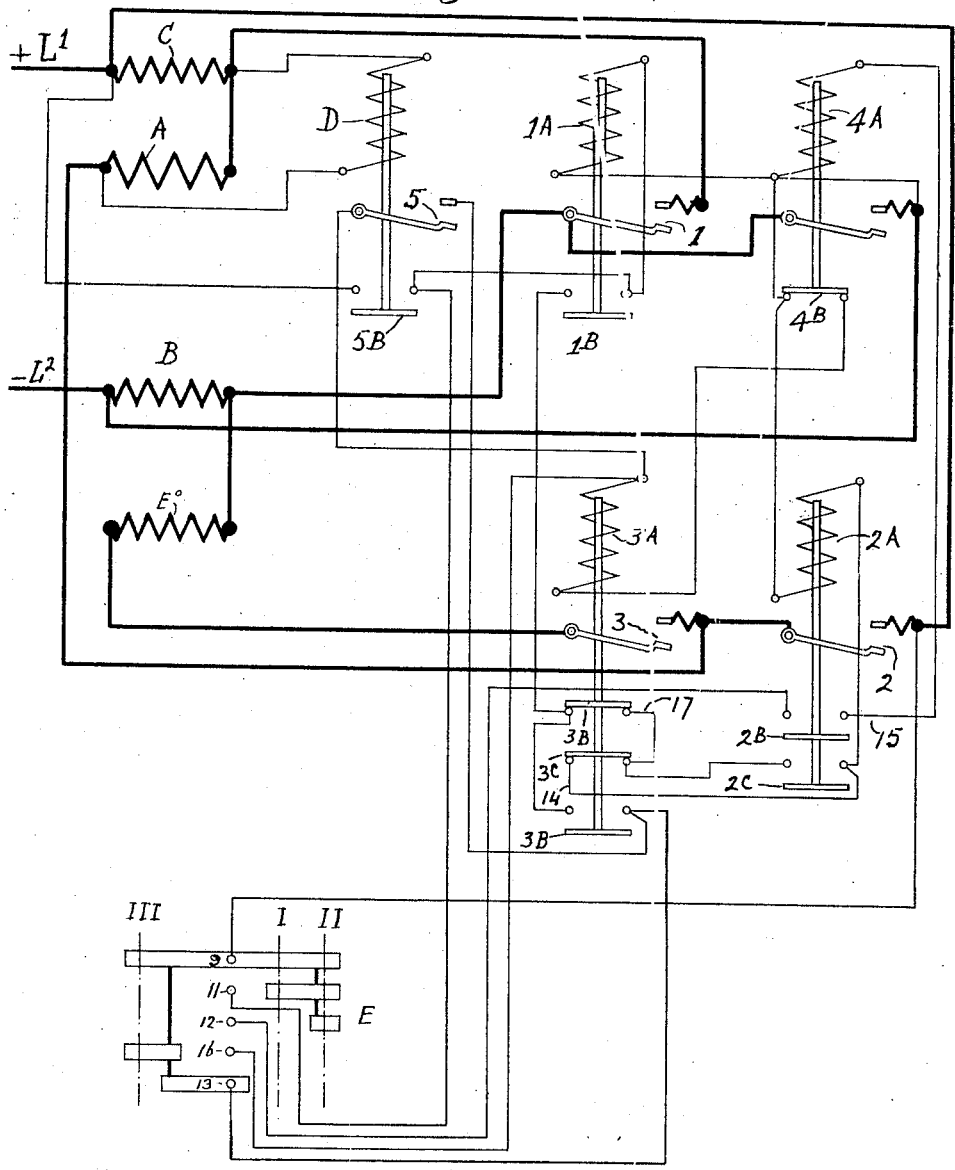

Patented Dec. 2, 1924.

1,517,276

UNITED STATES PATENT OFFICE.

WILFRID BROOKE, OF HALE, AND HENRY EDWARD BOWEN, OF SHEFFIELD, ENGLAND, ASSIGNORS OF ONE-FOURTH TO EDWARD HOLME AND COMPANY LIMITED, OF ALTRINCHAM, ENGLAND, AND ONE-FOURTH TO STEEL, PEECH AND TOZER LIMITED, OF ICKLES, NEAR SHEFFIELD, ENGLAND.

CONTROL OF ELECTRIC LIFTING MAGNETS.

Application filed July 28, 1921. Serial No. 488,189.

*To all whom it may concern:*

Be it known that WILFRID BROOKE and HENRY EDWARD BOWEN, subjects of the King of Great Britain and Ireland, residing, respectively, at "Braemar," Laburnum Road, Hale, in the county of Chester, England, and "Rockmount," Rupert Road, Nether Edge, Sheffield, in the county of York, England, have invented new and useful Improvements in and Relating to the Control of Electric Lifting Magnets, of which the following is a specification.

This invention relates to improvements in and relating to the control of electric lifting magnets.

The present scheme relates to the control of direct current magnets and includes the provision of several electrically controlled switches so arranged as to energize the lifting magnet and also to discharge the magnetic field when de-energizing and also to reverse the magnetic flux for completing the de-energization. These said operations are governed by the current or potential values of the inductive discharge from the magnet winding while the latter is discharging the stored up energy of the field into a closed circuit (hereinafter referred to as the discharge circuit) in a manner about to be described.

This scheme has for its object the control of lifting magnets which involve the use of high magneto forces, without causing undue rises of voltage on the magnet windings or the supply circuit from which current is taken during the switching on, switching off, and reversing of the lifting magnet winding.

In certain schemes the magnet windings are switched off by inserting a number of resistance divisions consecutively in series with same and depend on the discretion of the operator, in carrying out the operation slowly in order to minimize the inductive rise of voltage on the circuit to which the magnet winding is connected, and reduce the destructive arcing on the control gear contacts. In other schemes electrically operated switches are provided with powerful magnetic blow-outs for interrupting the circuit quickly and reducing the destructive arcing on the circuit closing switches. While these systems give a certain amount of protection to the circuit and to the control apparatus they aggravate the conditions in the magnet and its winding and render it susceptible to breakdown under the high induced voltages when switched on, and off, and reversed.

In our proposed arrangement we dissipate the inductive discharge, by providing a closed circuit of low resistance across the magnet winding. Thus the current through the magnet winding and the potential of same, dies away on being switched from the supply circuit, and in order to ensure this operation being carried out completely, which is a feature of paramount importance, we provide a means of automatically maintaining this discharging circuit closed so that it cannot be opened by the operator until the discharging operations have been completed, that is, carried out to zero or a low value.

In some other systems the magnet winding is permanently shunted by a high resistance of equal or greater value than the magnet winding. While this dissipates the energy stored in the magnetic field it does so by allowing the voltage to rise when switching off as on account of the high resistance of the circuit into which the magnet discharges, the value of the current being discharged is low and hence the voltage high. Using a higher permanent resistance would pass a still smaller current on discharge and would permit a correspondingly higher voltage across the magnet windings. On the other hand, if a permanent resistance of low value be used in shunting the magnet the power taken would be considerable and if further reduced to zero would short circuit the supply system.

Under our new system we propose to use a starting resistance and a reversing resistance so arranged that when energizing the lifting magnet, the magnet winding is connected to the source of supply in series with the above mentioned starting resistance, thereby energizing the lifting magnet at a fractional potential and thus partly establishing the magnetic flux. The starting resistance is then short circuited thus increasing the potential on the magnet winding to that of the source of the supply and increasing the magnetic flux to its full value also.

In de-energizing the lifting magnet we re-introduce the starting resistance which, while reducing the current to a certain extent, does not appreciably reduce the magnetic field. We then short circuit the magnet winding, still keeping the starting resistance in the circuit for limiting the current taken from the supply system during this operation.

A current controlled relay is arranged with its series wound operating coil connected in the discharging circuit thus caused by short circuiting the magnet winding. The relay remains closed while current is flowing round the discharging circuit and this circuit is maintained closed until the discharge current reaches zero or a low value at which it is considered safe to open same and thus leave the magnet winding completely switched off from the supply.

This operation may equally well be carried out by means of a potential relay with its shunt wound operating coil connected across a portion of the magnet winding or shunted across a low resistance connected in the discharge circuit, so that the discharge circuit cannot be opened until the potential of the discharge circuit falls to zero or a low value as above described. If it becomes necessary to more completely de-energize the lifting magnet more particularly in relation to its residual magnetism, we arrange a reversing resistance through which the lifting magnet is energized in the opposite direction, but only to a sufficient extent to neutralize the residual field and bring the flux to zero.

By our system this reversing can only be carried out after the magnet has been discharged either completely or partly of its energy as found desirable. In like manner the magnet cannot be re-connected to the supply or energized before it has been discharged in the manner hereinbefore mentioned.

The current or potential controlled relay above described could be arranged to open at adjustable or fixed values as desired, and would consist of an electrically operated switch of any ordinary design provided with a series or shunt operating coil or if required to be adjustable could be of a type shown in Fig. 8 of the specification of British Patent 141,870, or any standard adjustable relay.

The attached drawings serve to set forth our invention more fully and are dealt with in detail in the following description.

In said drawings:—

Fig. 1 is a diagrammatic plan view illustrating our invention; and Fig. 2 is a similar view showing a modification.

Referring to Fig. 1, this shows a diagram of a scheme of connection in conformity with the foregoing description. The lifting magnet winding is shown at A in the circuit of which are starting and reversing resistance sections B and C respectively. The circuit closing contactors for energizing the magnet through the starting resistance are shown at 1 and 2 and the contactor for short circuiting the starting resistance is shown at 4. The circuit closing contactor for the reverse direction is shown at 3, the source of supply being connected at $L^1$ and $L^2$. The discharging circuit is established by the closure of contactors 1 and 3 which short circuit the magnet winding, and included in which circuit is connected a series operating coil D of the current controlled relay 5.

The operating coils of various contactors are shown to correspond with the contactor switches. Thus the operating coil $1^A$ shown in Fig. 1 closes contactor 1 shown in Fig. 1, and similarly operating coils $2^A$, $3^A$ and $4^A$ represent the operating coils which close contactors 2, 3 and 4 respectively, and, as above stated, the series operating coil D represents the operating coil of the relay 5.

The master controller is shown at E with its developed drum connections.

Auxiliary switches $1^B$, $2^B$, $2^C$, $3^B$, $3^C$, $4^B$ and and $5^B$ are provided which are operated by the contactors 1, 2, 3 and 4 and current relay 5 respectively. Auxiliary switch $3^B$ is adjusted to operate after the main contacts of contactor 3 have touched. Auxiliary switches $3^C$ and $4^B$ are adjusted to make contact only when the contactors 3 and 4 are fully open. All these auxiliary switches are shown in the diagram in their normal positions with the contactors open.

Having now disconnected the magnet rangement of the parts, the working of the scheme would be as follows:—

$L^1$ and $L^2$ are the source of potential for the operating coil circuits of the contactors. Assuming now the master controller E is moved to step No. 1 so that the drum makes contact with the contact fingers 9 and 11, current will then pass from the source of supply $L^1$ to controller finger 9 through the two topmost rings of the controller drum, through contact 11, through coil $1^A$ and to line $L^2$ which is the other source of supply, thus causing contactor 1 to close and with its auxiliary switch $1^B$. Current will then also flow from controller finger 11, through auxiliary switch $1^B$, through auxiliary switch $3^B$ to 17 and through auxiliary switch $3^C$ to 14 and through operating coil $2^A$ to $L^2$, causing contactor 2 to close, thus completing the circuit of the magnet winding A through the starting resistance B. If the master controller E be moved to the second point, contact No. 12 will be brought into contact with the drum contacts of the master controller. Current will then flow from $L^1$ through contact 9 and contact 12 on the master controller to auxiliary switch $2^B$ which was closed by contactor 2, through 15, coil $4^A$ and to the other source of supply $L^2$, thus effecting the closure of contactor 4 which short circuits the starting resistance and places the lifting magnet winding on full voltage.

Supposing now it is desired to de-energize the magnet, the master controller is brought to the "off" position which is the position in which it is shown at E, contactor No. 4 will be opened by its supply circuit being interrupted at the master controller connection 12. This reinserts the starting resistance B. The coil circuit of contactors 1 and 2 is also cut off from the master controller at contact 11, but since the contactor coils $1^A$ and $2^A$ have another source of supply which retains them closed, they cannot be opened by the master controller. This retaining circuit for coils $1^A$ and $2^A$ is provided by the current relay No. 5 which is closed by its series operating coil D by the current which passes when contactors 1 and 2 are closed.

Auxiliary switch $5^B$ is closed at the same time as the relay contacts marked 13 and 16. This current relay 5 provides a path to coil $1^A$ and $2^A$ as follows:—$L^1$ auxiliary switch $5^B$, through connection 11 and contactor coil $1^A$ to supply $L^2$ and also from $L^1$ to auxiliary switch $5^B$ by connection 11, through auxiliary switch $1^B$ which is closed while contactor 1 is closed, through auxiliary switches $3^B$ and $3^C$ which are closed at connections 17 and 14 respectively while contactor 3 is open, along connection 14, through contactor coil $2^A$ to supply $L^2$. Thus it will be seen that after the lifting magnet has once been energized the control of contactor 1 and 2 is taken out of the hands of the operator from the master controller and placed under the control of the current relay 5.

The operation of bringing the master controller to the "off" position however, brings a source of supply through contact 13 on the master controller, through relay 5 which was closed in the first place by the current flowing through the magnet circuit, on connection 16, through contactor coil $3^A$, out through auxiliary switch $4^B$ which is only closed when contactor 4 is open, thus ensuring the starting resistance being re-inserted, thence to supply $L^2$. Thus contactor 3 closes which along with contactor 1 short circuits the lifting magnet winding after the starting resistance is re-inserted. On the closing of contactor 3, auxiliary switch $3^B$ and $3^C$ open, the former opening connection 17 after the main contacts on contactor 3 are closed. This interrupts the circuit of the contactor coil $2^A$, and contactor 2 then opens, thus providing a means of short circuiting the magnet before interrupting the supply to the magnet winding at contactor 2 which is a feature of this invention and thus prevents the very high inductive E. M. F. which would otherwise be created. It should be noted that while auxiliary switches $3^B$ and $3^C$ both open when contactor 3 closes, the latter $3^C$ as already mentioned is timed to open much earlier than auxiliary switch $3^B$, in other words, when contactor 3 is opening auxiliary switch $3^B$ closes on to contact 17 before the main connection on contactor 3 are opened, while auxiliary switch $3^C$ does not close on to contact 14 until the main connection of contactor 3 are fully opened. The object of this will be appreciated in the later description.

In order to prevent the auxiliary switch $3^C$ from opening contactor coil $2^A$ too soon, that is, before auxiliary switch $3^B$ opens by the closure of contactor 3, auxiliary switch $3^C$ is short circuited by auxiliary switch $2^C$ while contactor 2 is closed, avoiding any possibility of opening the circuit at contactor 2 before the discharging circuit is established.

Having now disconnected the magnet from the supply circuit after having previously short circuited it as above described, the inductive discharge is circulated round the local path which short circuits the magnet and there is no rise of voltage in the magnet and the flux dies away gradually. The current discharged by the magnet flowing in this local circuit maintains relay 5 closed by means of its series coil D which is within the local circuit above referred to, until the discharging current is zero or a pre-determined low value when relay 5 will open. Contactors 1 and 3 then open. While discharging is taking place, contactors 1 and 3 are maintained closed irrespective of the master control connections, as follows:— $L^1$ auxiliary switch $5^B$ closed, through connection 11 coil $1^A$ and to $L^2$, which maintains contactor 1 closed. The circuit of contactor 3 will be $L^1$ auxiliary switch $5^B$, connection 11, to auxiliary switch $1^B$ closed, through auxiliary switch $3^B$ closed on connection 13, through relay 5 to connection 16, through coil $3^A$, auxiliary switch $4^B$ closed to line $L^2$, thus maintaining contactor 3 closed. Both contactors remain thus connected until the circuits above mentioned are opened by current relay 5. The operation of discharging cannot thus be interfered with by moving the master controller.

If the lifting magnet is not sufficiently de-energized for instance, when the magnet is handling scrap or other small pieces of metal, the residual field may be sufficiently strong to attract the small light pieces and in order to ensure their dropping off it sometimes becomes necessary to reverse the magnet through a high resistance and thus energize it in the opposite direction with a magneto motor force of about 2 to 5% of normal, as may be found necessary to destroy the residual field. In order to reverse, it is necessary only to close contactor 3, which may be effected by moving the master controller to the position 3, in which case the path of the current is as follows:—Supply $L^1$ to master controller connection 9, connection 16, contactor coil $3^A$, auxiliary switch $4^B$, contingent upon contactor 4 being open and out to supply $L^2$.

Assuming now that after the magnet was energized, instead of moving the master controller to the "off" position, it is moved straight through to the reversing step III. No reversing can take place until the cycle of operations described above have taken place and the discharging operation has been completed and the series relay 5 controlled by the current has opened, since the contactor for reversing is one of those which closes the local circuit for discharging the magnet. This is another important feature of our invention. As soon as the discharging of the magnet is complete, relay No. 5 along with its auxiliary switch $5^B$ will open and will open the maintaining circuit of contactor coil $1^A$ by the opening of the auxiliary switch $5^B$, but since the master controller is in the reversing position or third point, the opening of relay 5 does not disconnect contactor coil $3^A$, the circuit being $L^1$, controller finger 9 and 16 through coil $3^A$, auxiliary switch $4^B$ and supply $L^2$ leaving contactor 3 alone closed, thus automatically reversing the magnet winding on the opening of contactor 1. This will be more clearly followed by reference to Fig. 1, the current passing from $L^1$ through the reversing resistance C, through the magnet winding A, through contactor 3 and starting resistance B to line $L^2$. Thus it will be clear that reversing is effected without first opening the circuit and disturbing the discharge path connections, and this is a particular feature of our scheme.

Assuming now that the master controller be moved to step No. II and the magnet winding be fully energized across the line potential as above described and then let us suppose the master controller be moved to the "off" position in the manner also described as above so that the local discharge circuit is established by the closure of contactors Nos. 1 and 3 and let us further suppose that instead of the operator waiting for the discharging to be completely carried out, he immediately moves the master controller back again to the second position, it will be observed that the path from $L^1$ through the master controller finger 9 and 11 to coil $1^A$ merely connects the line $L^1$ to coil $1^A$ at point 11, which is already connected to that source of supply by auxiliary switch $5^B$, which is held closed by series relay 5, thus contactor 1 still remains closed along with No. 3 while discharging. Contactor 2 cannot close while contactor 3 is closed, as the only available feed is through auxiliary switch $3^B$ which is open on connection 17. Contactor No. 4 being dependent upon auxiliary switch $2^B$ for its source of supply cannot close because contactor 2 is open, as are also its auxiliary switches $2^B$ and $2^C$, thus the discharging circuit cannot be opened by attempting to reenergize the magnet.

If the master controller be left in position II until the discharge has been completed, current relay 5 will open when the value of discharge current is insufficient to maintain same closed and auxiliary switch $5^B$ will also open along with it. This latter will open the previous supply path from $L^1$ to 11 on coil $1^A$, but the master controller being in the full "on" position on step II, there is an alternative path through the master controller to coil $1^A$, through contact 9 and 11, thus contactor 1 does not open. The opening of the relay contacts at 13 and 16 interrupts the source of supply to contactor 3, which opens. Auxiliary switch $3^B$ closes on connection 17 before contactor 3 has actually opened the circuit with its main contact. Immediately contactor 3 is completely opened auxiliary switch $3^C$ which is in series with the above in the feed circuit of contactor coil $2^A$ closes. At this stage contactor 2 closes, the path being $L^1$, master controller connection 9, 11 through auxiliary switch $1^B$ closed, through auxiliary switch $3^B$, 17, through auxiliary switch $3^C$ (which is no longer short circuited by auxiliary switch $2^C$) through connection 14, coil $2^A$ and $L^2$, thus closing contactor 2 and at the same time auxiliary switches $2^B$ and $2^C$. The closure of $2^B$ completes the circuit through contactor coil $4^A$ from the master controller 12, $2^B$, 15, and $L^2$, which closes contactor 4 and makes the connections correspond with the position of the master controller.

This system of interlocking forms a valuable and important feature in our invention in that it ensures complete protection against careless operation in preventing the circuit being opened without having been previously discharged after it has once been energized, as for instance, if contactor No. 4 be allowed to close while the magnet is discharging, the auxiliary switch $4^B$ would open and break the supply to coil $3^A$ from line $L^2$, whereupon contactor 3 would open and the discharge path be broken before having completely discharged and would result in a high potential across the magnet winding which it is the object of this invention to avoid, and this will be understood by those skilled in the art.

In the operation of auxiliary switches 3$^B$ and 3$^C$ as above described, it will be noted that in the operation of contactors 2 and 3 that 3 must always close before 2 opens, to ensure establishing the discharging circuit before disconnecting the magnet from the line. On the other hand, contactor 3 must be completely open before 2 commences to close and our method of carrying this out forms a further feature of our arrangement which will be understood from the foregoing details.

We do not wish this invention to be construed too narrowly or specifically in relation to the means for carrying same out as there are several conceivable alternative arrangements which would embody the spirit of this invention.

For instance we may elect to use a starting resistance B, that may be cut out in a number of stages by additional electrically operated switches as may be found desirable in meeting any particular condition. In like manner the resistance C, provided for reversing may be also cut out in a number of stages so as to be variable instead of fixed if required.

A further arrangement as shown in Fig. 2, sets forth an alternative arrangement which has already been referred to but not described in detail. It consists of using a potential controlled relay instead of the current controlled relay No. 5, of Fig. 1. The remainder of the scheme and its operation will be otherwise as already described in reference to Fig. 1 with the exception that relay No. 5 will be provided with a shunt coil instead of a series coil. In Fig. 2, A is the magnet winding, B is the starting resistance, C the reversing resistance, and E$^o$ is a low resistance included in the discharging circuit proportioned so as to give a voltage drop across it of approximately 10 per cent of the supply volts when traversed by the full current value of the magnet winding, or whatever value is found most convenient, which can only take place when the magnet begins to discharge into the local circuit formed by the resistance E$^o$ and the closing of contactors 1 and 3. The potential coil of relay 5 would be connected across the magnet and would close as soon as the magnet is switched on. Immediately on the closing contactors 1 and 3 when discharging as hereinbefore described the voltage across the operating coils of the potential relay 5 would become reduced from that of the supply to a value equal to the product of the discharge current in amperes and the ohmic resistance value of E$^o$, which voltage would die away as the discharge current dissipates itself to a zero value or a predetermined value at which the relay is arranged to open, whereupon contactors 1 and 3 open and the cycle of operations is allowed to be continued by the operator exactly in the manner previously described.

This may be varied somewhat by connecting the potential coil of relay 5 across a portion of the magnet winding say across 25% of the turns in which case the resistance E$^o$ Fig. 2 would not then be required. The operation would otherwise be as described in the foregoing.

We declare that what we claim is:—

1. In a device of the class described, the combination with a lifting magnet, a source of current supply, and means for closing a circuit through said magnet, of means for dissipating the inductive discharge of the magnetic field while the magnet is being deenergized, said means comprising a plurality of electrically controlled switches, a resistance adapted to be inserted in series with the magnet's winding by the operation of said switches, means for short circuiting said magnet winding before disconnection from the source of supply while maintaining said resistance in circuit, means for forming a closed circuit of low resistance across the magnet winding after disconnection from the source of supply, and at least one relay adapted to be controlled by the magnet winding while the inductive discharge is flowing in said closed circuit, said relay being so disposed that the discharging circuit is maintained closed until the current of the inductive discharge has reached a predetermined low value.

2. In a device of the class described, the combination of a lifting magnet, a source of current supply, means for controlling the circuit through said magnet thereby to energize and deenergize the same, and means actuated by the closing of the circuit for ensuring the complete decay of current in the discharging circuit before the energizing circuit is again closed.

3. In a device of the class described, the combination of a lifting magnet, a source of current supply, means for controlling the circuit through said magnet thereby to energize and deenergize the same, and a plurality of circuit-closing contactors adapted to be successively brought into operation by the closing of the circuit for ensuring the complete decay of current in the discharging circuit before the energizing circuit is again closed.

4. In a device of the class described, the combination of a lifting magnet, a source of current supply, means for controlling the circuit through said magnet thereby to energize and deenergize the same, means actuated by the closing of the circuit for ensuring the complete decay of current in the discharging circuit before the energizing circuit is again closed, and means for energizing the magnet in the opposite direction.

5. In a device of the class described, the combination of a lifting magnet, a source of current supply, means for controlling the circuit through said magnet thereby to energize and deenergize the same, means actuated by the closing of the circuit for ensuring the complete opening of the discharging circuit before the energizing circuit is again closed, a second resistance, and means for reversing the magnet through said resistance.

6. In a device of the class described, the combination of a lifting magnet, a source of current supply, means for controlling the circuit through said magnet thereby to energize and deenergize the same, means actuated by the closing of the circuit for ensuring the complete opening of the discharging circuit before the energizing circuit is again closed, a second resistance, and automatically operative means for reversing the magnet through said resistance.

7. In a device of the class described, the combination of a lifting magnet, a source of current supply, means for controlling the circuit through said magnet thereby to energize and deenergize the same, means actuated by the closing of the circuit for ensuring the complete opening of the discharging circuit before the energizing circuit is again closed, a second resistance, means for reversing the magnet through said resistance, and means for preventing reversing until the complete cycle of operations has taken place.

In testimony whereof we have signed our names to this specification.

WILFRID BROOKE.
HENRY EDWARD BOWEN.